(12) United States Patent
Garde et al.

(10) Patent No.: US 7,704,361 B2
(45) Date of Patent: Apr. 27, 2010

(54) METHOD AND APPARATUS FOR ISOLATION OF IONIC SPECIES FROM A LIQUID

(75) Inventors: Arvid Garde, Hillerod (DK); Jens-Ulrik Rype, Gentofte (DK); Gunnar Jonsson, Vaerlose (DK)

(73) Assignee: Jurag Separation A/S, Allerod (DK)

( * ) Notice: Subject to any disclaimer, the term of this patent is extended or adjusted under 35 U.S.C. 154(b) by 547 days.

(21) Appl. No.: 10/450,558

(22) PCT Filed: Dec. 6, 2001

(86) PCT No.: PCT/DK01/00810

§ 371 (c)(1),
(2), (4) Date: Jul. 23, 2003

(87) PCT Pub. No.: WO02/48044

PCT Pub. Date: Jun. 20, 2002

(65) Prior Publication Data

US 2004/0079704 A1    Apr. 29, 2004

(30) Foreign Application Priority Data

Dec. 12, 2000    (DK) .............................. 2000 01862

(51) Int. Cl.
*B01D 61/44* (2006.01)
(52) U.S. Cl. .................. 204/522; 204/537; 204/631; 204/633
(58) Field of Classification Search ................ 204/522, 204/537, 631, 633
See application file for complete search history.

(56) References Cited

U.S. PATENT DOCUMENTS

| 3,165,415 A | * | 1/1965 | Kilburn et al. ............. 426/239 |
| 3,776,530 A |  | 12/1973 | Griffith et al. |
| 3,870,613 A |  | 3/1975 | Nakamura et al. |
| 4,057,483 A | * | 11/1977 | Giuffrida ................ 204/630 |
| 4,376,023 A | * | 3/1983 | Venkatsubramanian et al. ................. 204/541 |
| 4,381,232 A |  | 4/1983 | Brown |
| 4,536,269 A | * | 8/1985 | Chlanda et al. ........... 204/535 |
| 4,578,160 A |  | 3/1986 | Asano et al. |
| 4,608,141 A | * | 8/1986 | Chlanda et al. ........... 204/538 |
| 4,740,281 A | * | 4/1988 | Chlanda et al. ........... 204/528 |
| 5,114,554 A |  | 5/1992 | Voss et al. |

(Continued)

FOREIGN PATENT DOCUMENTS

DE        197 00 044 C1    2/1998

(Continued)

OTHER PUBLICATIONS

Database WPI Section Ch, Week 199544, Derwent Publications Ltd., London GB, Class D15, AN 1995-339402, XP002902354 & JP 07 232038 A (Asahi Glass Co., Ltd.) Sep. 5, 1995,, Abstract.

(Continued)

*Primary Examiner*—Arun S Phasge
(74) *Attorney, Agent, or Firm*—Darby & Darby, P.C.

(57) ABSTRACT

The present invention relates to a method for isolation of ionic species from a liquid and an apparatus for isolation of ionic species from a liquid. Moreover the invention relates to an electro enhanced dialysis cell and the use of the cell in the method and the apparatus.

38 Claims, 8 Drawing Sheets

U.S. PATENT DOCUMENTS

| | | | |
|---|---|---|---|
| 5,419,821 A | * | 5/1995 | Vaughan .................. 204/522 |
| 5,645,703 A | | 7/1997 | Tsai |
| 6,379,517 B1 | * | 4/2002 | Heydecke et al. .......... 204/522 |

FOREIGN PATENT DOCUMENTS

| | | |
|---|---|---|
| JP | 06-063365 | 3/1994 |
| JP | 07-126997 | 5/1995 |
| WO | WO-02/05933 A1 | 1/2002 |

OTHER PUBLICATIONS

Database WPI Section Ch, Week 198902, Derwent Publications Ltd., London GB, Class D15, AN 1989-013548, XP002902355 & JP 63 291608 A (Tokuyama Soda KK), Nov. 29, 1988, Abstract.

Database WPI Section Ch, Week 199015, Derwent Publications Ltd., London GB, Class B04, AN 1990-112326, XP002902356 & JP 02 063527 A (Tosoh Corp.) Mar. 1990, Abstract.

Database WPI Section Ch, Week 199131, Derwent Publications Ltd., London GB, Class D15, AN 1991-226805, XP002902357 & JP 03 146118 A (Daido Chem Enegg KK), Jun. 21, 1991, Abstract.

\* cited by examiner

METHOD AND APPARATUS FOR ISOLATION OF IONIC SPECIES FROM A LIQUID

The present invention relates to a method for isolation of ionic species from a liquid and an apparatus for isolation of ionic species from a liquid. Moreover the invention relates to an electro enhanced dialysis cell and the use of the cell in the method and the apparatus.

Isolation of ionic species from liquids is a very important industrial process used within such a broad technical field, as from refining metals to purification of lactic acid from a fermented liquid.

A large number of processes and apparatuses have been investigated and introduced in order to improve the processes of isolation of ionic species from liquids. Among those processes and apparatuses are filtration with ultra- and nano-filters, exchanging ions with ion-exchangers and electrodialysis with electrodialysis cells.

Japanese patent application no. 63335032 discloses a desalting apparatus. The apparatus consists of a donnan dialysis apparatus to desalt a solution and an electric dialysis apparatus for reproducing and re-using an acidic or alkaline solution in the desalting process. The apparatus is not suitable for desalting liquid-containing particles.

U.S. Pat. No. 5,746,920 discloses a process for purifying dairy wastewater. The process comprises first treating the wastewater with base. The treated wastewater is then introduced into a fermenting tank, where the lactose present in the wastewater is fermented to form a broth and lactic acid. The broth is subjected to purification by ion-exchanging and nano-filtration and the purified broth is subjected to bipolar electrodialysis to yield concentrated acid and base solutions from the purified broth. The process according to the U.S. patent is complex and costly to carry out and there is a substantial loss of product during the filtration. Furthermore the process is designed to isolate specific ionic species.

Japanese patent application JP7232038 discloses a method of recovering high concentration alkali from liquid containing alkali utilizing a combination of diffusion dialysis, using cation exchange membranes and bipolar electrodialysis. No counter-measures are taken to prevent fouling of ion exchange membranes in the diffusion cell from liquids containing proteinuous material, e.g. fermentation broth. Due to the very low driving force across the cation exchange membrane in the diffusion dialysis cell only a very limited flux can be obtained.

Japanese patent application JP63291608 discloses a system for regenerating acidic waste liquid utilizing a combination of diffusion dialysis using anion exchange membranes and bipolar electrodialysis. The flux in the diffusion cell be low. Moreover impurities such as calcium and magnesium ions would prevent the use of bipolar electrodialysis due to the fact that bipolar membranes are damaged or destroyed by presence of even very small amounts of calcium or magnesium ions.

German patent no. DE 19700044 C1 discloses a method for production of acid and alkaline products by monopolar electrodialysis followed by bipolar electrodialysis. The monopolar electrodialysis cannot selectively remove either cations or anions from a liquid, thus lactic acid cannot be removed without removing e.g. calcium, which would cause problems in the bipolar electrodialysis. The conventional monopolar electrodialysis is susceptible to fouling by biological material, proteins, etc.

U.S. Pat. No. 3,870,613 discloses a method of recovering salts from milk or milk products. In this method cation exchange membranes, anion exchange membrane and electrodes are used to transport salts to a second solvent. The polarity of the electrodes is periodically reversed in order to clean the membrane.

U.S. Pat. No. 4,776,530 discloses an apparatus for removing cations of lime from tap water. In the apparatus cation exchange membranes are used to facilitate the transport. The polarity of the electrodes is changed intermittently.

The object of the invention is to provide a method and an apparatus which make it possible to transfer either cations or anions into a permeate even when the direction of the electric field is reversed.

Another object of the invention is to provide a method and an apparatus for isolation of ionic species which method and apparatus are simple and cost-effective and provide a high output.

A further object of the invention is to provide a method and an apparatus for isolation of ionic species which method and apparatus can be used for isolation of ionic species in liquids containing solids and particles. The invention is in particular useful for separating ionic species from liquids containing particles of organic material and multivalent inorganic metal ions.

Moreover it is an object of the invention to provide a method and an apparatus for isolation of ionic species which method and appratus are useful for isolation of ionic species in a liquid containing organic material.

These objects are achieved by the present invention as defined in the claims.

By the term ionic species is meant that the species are in a ionic state. For example when sodiumchloride NaCl is dissolved in water it dissociates into the ions $Na^+$ (cat-ion) and $Cl^-$ (an-ion). As the ions have a small electric charge, it is possible to move the ions in an electric field.

The invention provides a method and an apparatus for separating ionic species from a liquid. By using the invention it is possible to separate ionic species from liquids which are highly contaminated, e.g. with particles. The separation can be performed without any need for a filtration step and it is possible to obtain a high output.

The method according to the invention for transferring of ionic species from a first liquid to a second liquid comprises the steps of:
passing a first liquid through at least on first chamber defined by a pair of either cat-ion exchange membranes or an-ion exchange membranes,
passing a second liquid which has an ionic component in a higher concentration than the concentration of the same component in the first liquid, through at least two further chambers, each further chamber being located adjacent to at least one first chamber,
applying an electric field over the membranes by means of at least two electrodes.

The first liquid may be provided to the electro enhanced dialysis cell from a storage tank. In a dialysis cell the ionic species are transferred into a second liquid which has a pH value differing form the pH value of the first liquid. The difference in pH causes a difference in concentration of $H^+$ and $OH^-$ in the first and the second liquid. The concentration difference between the first and the second liquid will be the driving forces in the electro enhanced dialysis cell. The difference in concentration will cause a flow of either $H^+$ or $OH^-$ ions from the second liquid into the first liquid thereby building up an electric potential difference or a diffusion potential which will cause either cat-ions ($M^+$) or an-ions ($X^-$) of the ionic species to be transported from the first liquid into the second liquid through cat-ion exchange membranes or an-ion membranes, respectively. If the ionic species are cat-ions, the second liquid will be acidic compared to the first liquid, and visa versa, if the ionic species are an-ions. This process has been enhanced by the electro enhanced dialysis cell according to the invention, in which the driving forces have been enhanced by use of an electric field. The electro enhanced dialysis cell will be described in more details in the following.

After treatment in the electro enhanced dialysis cell the second liquid may be treated in a bipolar electrodialysis cell. In the bipolar electrodialysis cell the ionic species will be concentrated. If the ionic species are cat-ions, the third liquid will be basic compared to the second liquid, and visa versa, if the ionic species are an-ions. The driving force in the bipolar electrodialysis cell is a difference in electric potential caused by a constant direct current through the cell.

The membranes, acid, bases, and pH can of course be selected depending on the ionic species to be separated. This selection can be done by the skilled person.

When the ionic species are separated and concentrated into the third liquid, it can of course be separated from the third liquid, e.g. to obtain a dry or a substantially dry product.

The method according to the invention comprises the feature of applying an electric field of direct current through the electro enhanced dialysis cell during the treatment of the first liquid. In this way the electric potential difference or diffusion potential is enhanced and thereby increases the number of ionic species which are transferred into the second liquid from the first liquid.

In order to improve the results from the cell it is preferred to change the direction of the electric field during the treatment of the first liquid. The direction of the electric field is preferably changed by changing the direction of the direct current. By changing the direction of the electric field it is possible to give a "self-cleaning" effect to the membranes used in the electro enhanced dialysis cell and prevent fouling of the membranes during treatment of the first liquid. When an electric field of direct current is applied to the cell electrically loaded particles are driven from the first liquid onto the membrane surfaces of the cell. Here the particles will build up a layer and after a time cause fouling which will make the membranes useless. If the electric field is reversed before the particles have caused fouling, the particles will be driven back from the membranes into the first liquid and the membranes will be cleaned.

In an embodiment according to the invention the electric field can be changed at predetermined substantially regular intervals, said intervals preferably being within the range from 5 seconds to 6000 seconds, more preferably within the range from 8 to 1000 seconds and even more preferably within the range from 10 seconds to 360 seconds. More specifically the intervals are determined by the nature of the first liquid and the amount and nature of particles present herein.

In a preferred embodiment of the method according to the invention for isolation of ionic species stored in a first tank, the method comprises the steps of:
  treating the first liquid in an electro enhanced dialysis cell to transfer the ionic species from the first liquid into a second liquid and optionally storing said second liquid in a second tank;
  treating the second liquid in a bipolar electrodialysis cell to transfer the ionic species from the second liquid into a third liquid and optionally storing the third liquid in a third tank By using a first, a second and a third tank for storing the first liquid, the second liquid and the third liquid, respectively, it is possible to obtain better control over the processes and optimise the treatment of the liquids in the electro enhanced dialysis cell and the bipolar electrodialysis cell. During the treatment the tanks serve as storage and/or buffers for the treated liquid or the liquid to be treated.

It is preferred that at least a part of the first liquid is recycled to the first tank after treatment in the electro enhanced dialysis cell. The liquid can be recycled via pipelines e.g. supplied with a pump and optionally a purge by which a part of the treated first liquid can be removed and/or replaced by untreated first liquid.

Moreover it is preferred that at least a part of the second liquid is recycled to the electro enhanced dialysis cell after being treated in the bipolar electrodialysis cell. The liquid can be recycled via pipelines, e.g. provided with a pump and optionally a purge by which a part of the treated second liquid can be removed and/or replaced.

Furthermore it is preferred that at least a part of the third liquid is recycled from the third tank to the bipolar electrodialysis cell. The third liquid may be recycled directly from the bipolar electrodialysis cell or from the third tank. By recycling the third liquid the ionic species will be concentrated in the liquid. It is possible to achieve very high concentrations in the third liquid. The concentration may be a factor 5 to 10 higher than in the know methods for separating ionic species from a liquid. Like in the previously mentioned recycling circuits pipelines, pumps, and a purge may be used.

In one preferred embodiment of the method according to the invention, the method further comprises the step of treating the third liquid in an electrodialysis cell to remove undesired ions, e.g. the presence of inorganic ions may be undesired, when you are separating ion of organic species from a liquid.

In a preferred embodiment of the method according to the invention the method further comprises the step of evaporating and/or crystallising and/or chromatographic treatment of the third liquid to separate the ionic species from the third liquid. By use of this embodiment of the method it is possible to achieve a very pure final product.

In a preferred embodiment of the method, the ionic species comprises anions from inorganic acids, organic acids, enzymes, peptides, hormones, antibiotics or amino acids. Moreover the ionic species comprises cat-ions from inorganic bases, organic bases, enzymes, peptides, hormones, antibiotics or amino acids. Thereby the method is useful for a wide range from of liquids containing ionic species. The method may e.g. be used for separating ionic species from streams from metal etching and food processing, including fermentation broth from fermentation of grass juice using strains of Lactobacillus bacteria, wastestream from lactic acid metal etching and waste streams from citrus oil production.

Preferably the ionic species separated according to the invention has a molar weight up to about 1000 g/mol.

The invention also relates to the use of the method according to the invention for isolating ionic species from a liquid.

Moreover the invention relates to isolated ionic species obtained by the method.

The invention also comprises an apparatus for isolation of ionic species from a first liquid which apparatus comprises
  an electro enhanced dialysis cell to transfer the ionic species from the first liquid into a second liguid,
  a bipolar electrodialysis cell to transfer the ionic species from the second liquid into a third liquid,
  optionally means for separating the ionic species from the third liquid.

The apparatus according to the invention has excellent properties with regard to separating ionic species from a liquid. Very high output can be achieved compared to known apparatuses. The function of the electro enhanced dialysis cell and the bipolar electrodialysis cell is as explained previously in the application.

In a preferred embodiment of the apparatus the electro enhanced dialysis cell comprises means for applying an electric field of direct current. The electric field enhances the electric potential difference in the cell and thereby increases the number of ionic species that can be transferred from the first liquid to the second liquid.

In a more preferred embodiment of the apparatus according to the invention the electro enhanced dialysis cell comprises means for changing the direction of the electric field. Preferably means for changing the direction of the direct current. The means may be in the form of electric switches, rectifiers, relays and the like. By changing the direction of the direct current a "self-cleaning" effect of the membranes is established.

In order to obtain the best possible "self-cleaning" effect the electric field can be changed at predetermined substantially regular intervals, said intervals preferably being within the range from 5 seconds to 6000 seconds, more preferably within the range from 8 to 1000 seconds and even more preferably within the range from 10 seconds to 360 seconds. The specific interval is dependent on the liquid from which it is wanted to separate the ionic species. The specific interval which is useful for a specific liquid can be determined by the skilled person as a matter of routine.

In a preferred embodiment the apparatus according to the invention comprises a first tank for the first liquid. The first tank is preferably placed before the electro enhanced dialysis cell. Furthermore the apparatus preferably comprises a second tank for the second liquid. This second tank is preferably placed after the electro enhanced dialysis cell.

Moreover the apparatus preferably comprises a third tank for the third liquid. The third tank is preferably placed after the bipolar electrodialysis cell.

In this specificly preferred embodiment of the invention the first, the second, and the third tank serve as storage and/or buffer for the first liquid, the second liquid, and the third liquid, respectively.

In another preferred embodiment of the apparatus according to the invention the apparatus comprises means for re-circulating at least a part of the first liquid from the electro enhanced dialysis cell to the first tank.

Furthermore the apparatus preferably comprises means for re-circulating at least a part of the second liquid to the electro enhanced dialysis cell after treatment in the bipolar electrodialysis cell.

Moreover the apparatus preferably comprises means for re-circulating at least a part of the third liquid from the third tank to the bipolar electrodialysis cell.

The means for re-circulating the liquids are normally pipelines which may be supplied with pumps and optionally with purges for removing/replacing liquid.

In a preferred embodiment of the apparatus according to the invention the means for applying an electric field of direct current is in the form of electrodes placed at two opposing ends in the electro enhanced dialysis cell. The electrodes may be of any known type and have any desired shape for the purpose.

In a particularly preferred embodiment of the apparatus according to the invention the electro enhanced dialysis cell is constituted by two or more electrodes placed at two opposing ends with cat-ion exchange membranes (CEM) and/or an-ion exchange membranes (AEM) placed there between.

The electro enhanced dialysis cell is normally box-shaped with a parallel bottom and top element, two parallel side elements and two end-elements. The membranes are placed in the cell with the membrane surface parallel to the end elements of the cell.

In a more preferred embodiment of the apparatus the electro enhanced dialysis cell is constituted by two electrodes placed at two opposing ends and with two end-membranes being placed next to each of the two electrodes, the end-membranes facing each other and having cat-ion exchange membranes (CEM) and/or an-ion exchange membranes (AEM) placed in between. The end-membranes and cat-ion exchange membranes (CEM) and/or an-ion exchange membranes (AEM) form adjacent chambers throughout the electro enhanced dialysis cell.

Preferably the end-membranes are neutral membranes and/or cat-ion exchange membranes and/or an-ion exchange membranes. The purpose of the end-membranes is substantially to prevent contact between the electrodes and contaminated liquid e.g. a first liquid.

When the apparatus is used for separating cat-ionic species from a liquid it is preferred to use cat-ion exchange membranes in the electro enhanced dialysis cell.

When the apparatus is used for separating an-ionic species from a liquid it is preferred to use an-ion exchange membranes in the electro enhanced dialysis cell.

The membranes form adjacent chambers throughout the cell in a direction parallel with surfaces of the side-elements of the cell. The surfaces of the membranes are perpendicular to this direction. The adjacent chambers are preferably adapted alternately to receive the first and the second liquid. The liquids are introduced in the cell in the known way by use of tubes, pipelines, valves, etc.

In one of the most simple embodiments of the apparatus according to the invention the electro enhanced dialysis cell is constituted of at least two an-ion exchange membranes or at least two cat-ion exchange membranes which, with the end-membranes, form a central chamber for the first liquid and a chamber on each side of the central chamber for the second liquid.

In a preferred embodiment of the apparatus according to the invention an even number of an-ion exchange membranes or an even number of cat-ion exchange membranes form an uneven number of chambers between and with the two end-membranes, said chambers being adapted alternately to receive the first and the second liquid in such a way that the two chambers constituted by an end-membrane and an an-ion exchange membrane or a cat-ion exchange membrane are adapted for receiving the second liquid. By organizing the membranes in such a way, it is possible to optimise the output of the cell. The number of membranes in the cell may be several hundreds, all placed parallel to each other and optionally with spacer gaskets in between, and which constitutes the adjacent chambers.

When the apparatus according to the invention is prepared for separating cat-ionic species, preferably the electro enhanced dialysis cell for separating cat-ionic species has cat-ion exchange membranes placed between the end-membranes When the apparatus according to the invention is prepared for separating an-ionic species, preferably the electro enhanced dialysis cell for separating an-ionic species has an-ion exchange membranes placed between the end-membranes In a preferred embodiment the apparatus further comprises an electrodialysis cell adapted to remove undesired ions from the third liquid, preferably the electrodialysis cell is placed after the bipolar electrodialysis cell.

In another preferred embodiment of the apparatus according to the invention the apparatus further comprises means for evaporating and/or crystallising and/or chromatographic treatment of the third liquid. Thereby it is possible to obtain a dry and/or pure final product by use of the apparatus.

The invention also relates to use of an apparatus according to the invention in the method according to the invention.

Furthermore the invention relates to use of the apparatus according to the invention for isolating ionic species from a liquid.

The invention also comprises an electro enhanced dialysis cell wherein the dialysis cell is enhanced with an electric field.

Preferably the electro enhanced dialysis cell is enhanced with an electric field of direct current.

In a preferred embodiment of the electro enhanced dialysis cell according to the invention the electro enhanced dialysis cell comprises means for changing the direction of the electric field, and preferably means for changing the direction of the direct current. The means for changing direction of the electric field may be. electric switches, rectifiers, relays, and the like. By changing the direction of the electric field a "self-cleaning" effect of the cell can be achieved as explained previously.

Preferably the electric field can be changed at predetermined substantially regular intervals, preferably said intervals are within the range from 5 seconds to 6000 seconds, more preferably within the range from 8 to 1000 seconds and even more preferably within the range from 10 seconds to 360 seconds. Hereby it is possible to adjust the cell to have the optimal "self-cleaning" effect.

In a preferred embodiment the electro enhanced dialysis cell the electric field is applied by electrodes which are placed at two opposing ends in the electro enhanced dialysis cell.

Preferably the electro enhanced dialysis cell is constituted by electrodes placed at two opposing ends with cat-ion exchange membranes (CEM) and/or an-ion exchange membranes (AEM) placed there between. When the cell is used for separation of cat-ionic species, it is preferred to use cat-ion exchange membranes. When the cell is used for separation of an-ionic species, it is preferred to use an-ion exchange membranes.

In a preferred embodiment of the electro enhanced dialysis cell the electro enhanced dialysis cell is constituted by electrodes placed at two opposing ends with two end-membranes being placed next to each of the two electrodes, said end-membranes facing each other and having cat-ion exchange membranes (CEM) and/or an-ion exchange membranes (AEM) placed in between.

It is preferred that the end-membranes are neutral membranes and/or cat-ion exchange membranes and/or an-ion exchange membranes. The purpose of the end-membranes is to prevent contact between the electrodes and contaminated liquid.

Moreover it is preferred that in the electro enhanced dialysis cell according to the invention the end-membranes and cat-ion exchange membranes (CEM) and/or an-ion exchange membranes are forming adjacent chambers, and the adjacent chambers are adapted to receive a first and a second liquid, preferably alternately.

When the electro enhanced dialysis cell is prepared for separating cat-ionic species, it is preferred that the electro enhanced dialysis cell has a first and a second electrode where the first electrode is placed at a first end-element in the electro enhanced dialysis cell and the second electrode is placed at a second end-element of the electro enhanced dialysis cell. The first and second end-element is opposite to each other. The electro enhanced dialysis cell further has a first and a second an-ion exchange membrane where the first an-ion exchange membrane is placed next to the first electrode and the second an-ion exchange membrane is placed next to the second electrode. The first and the second an-ion exchange membrane are facing each other and at least two cat-ion exchange membranes are placed between the first and the second an-ion exchange membrane with a distance from the an-ion exchange membranes and each other to provide adjacent chambers between adjacent membranes. When the cell is used for separating anionic species the placing of the cat-ion exchange membrane and the an-ion exchange membrane is reversed.

The invention relates to use of the electro enhanced dialysis cell according to the invention in the method according to the invention.

Moreover the invention relates to use of the electro enhanced dialysis cell according to the invention in the apparatus according to the invention.

The invention will now be described in further details with examples and reference to a drawing where.

EXAMPLE 1

Figure 1:
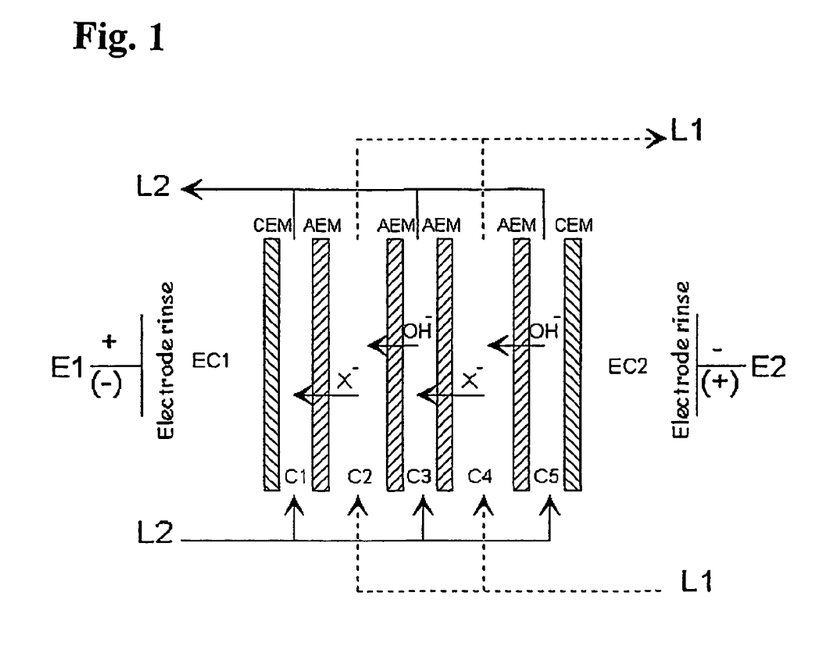
FIG. 1 shows an electro enhanced dialysis cell according to the invention, adapted to separate an-ionic species.

FIG. 1 shows a schematic drawing of an electro enhanced dialysis cell according to the invention. The cell has two electrodes E1 and E2, placed in electrode chambers EC1 and EC2, which are placed at opposite ends in the cell. The electrode chambers are separated from the central part of the cell by two end-membranes which in this case are two cat-ion exchange membranes CEM. The two end-membranes have four an-ion exchange membranes AEM placed in between. Thereby the two end-membranes and the four an-ion exchange membranes form five adjacent chambers C1, C2, C3, C4 and C5.

With this configuration the cell is adapted for separating an-ions $X^-$ from a liquid L1. Liquid L1 is led to the chambers C2 and C4 of the cell. The second liquid L2 which is a base when an-ions are separated, is led to the chambers C1, C3 and C5 of the cell. The difference in electrical potential between the two liquids is enhanced by a direct current applied by the electrodes E1 and E2.

When the situation is as illustrated in FIG. 1 where E1 is the positive electrode, the an-ions X− move in the direction of E1 and pass through the an-ion exchange membranes from the liquid L1 in chambers C2 and C4 to liquid L2 in chambers C1 and C3 as indicated by arrows.

The an-ions X− from L1 are replaced by hydroxide-ions OH− from L2.

When the direction of the direct current is reversed the an-ions X− move in the direction of E2 from the liquid L1 in chambers C2 and C4 through the an-ion exchange membranes into the liquid L2 in chambers C3 and C5. Furthermore, if the an-ion exchange membranes have been covered with particles, the an-ion exchange membranes will be cleaned as the particles are caused to move away from the membrane and as hydroxide-ions penetrate the membrane and dissolve the fouling layer.

As it is evident from FIG. 1, when the second liquid L2 is running in chambers on both sides of the chambers, where the first liquid L1 is running, the second liquid L2 will always receive an-ions X− from the first liquid L1 independently of the direction of the electric field.

Figure 2:
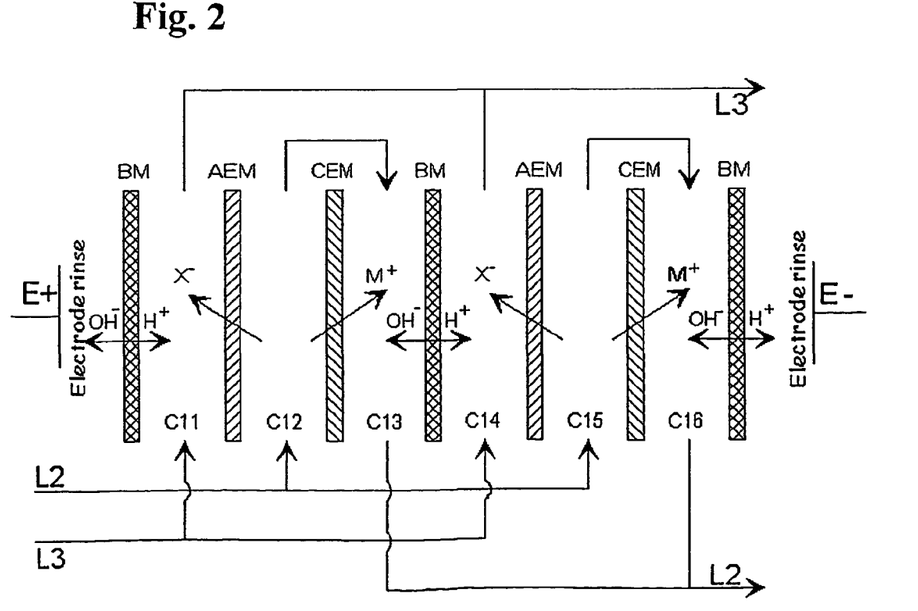
FIG. 2 shows a bipolar electrodialysis cell according to the invention adapted to separate an-ionic species.

FIG. 2 shows a schematic drawing of the bipolar electrodialysis cell according to the invention which is used for further treatment of the second liquid L2 from the electro enhanced dialysis cell. The bipolar electrodialysis cell has an electrode in each end. A positive electrode E+ in the first end and a negative electrode E− in the second end of the cell. Between the electrodes from E+ to E− are placed repeatingly first a bipolar membrane BM, an an-ion exchange membrane AEM and a cat-ion exchange membrane CEM. The stack of membranes forms adjacent chambers C11, C12, C13, C14, C15 and C16 and is finished with a bipolar membrane before the electrode E−.

In the case where the bipolar electrodialysis cell is used for separating an-ions the second liquid L2 which is basic compared to the third liquid L3, is first sent through the chambers C12 and C15 between an an-ion exchange membrane AEM and a cat-ion exchange membrane CEM. According to the invention the second liquid L2 is further sent through the chambers C13 and C16 between a cat-ion exchange membrane and a bipolar membrane. Hereafter the second liquid is recycled to the electro enhanced dialysis cell.

The third liquid L3 which is acidic compared to the second liquid L2, is sent through chambers C11 and C14 between a bipolar membrane and an-ion exchange membrane.

Due to the constant electric direct current through the cell, the ions (X−, M+, OH− and H+) are drawn in directions transversely to the membrane stack as indicated with arrows. The an-ions X− are together with hydrogen-ions H+ concentrated in the third liquid L3 in chambers C11 and C14.

It is clear that in case the bipolar electrodialysis cell is used for separating cat-ions from the second liquid L2, the second liquid will be sent through the chambers C12 and C15 between an an-ion exchange membrane and a cat-ion exchange membrane and further through chambers C11 and C14 between an an-ion-exchange membrane and a bipolar membrane.

Figures 3A, 3B:
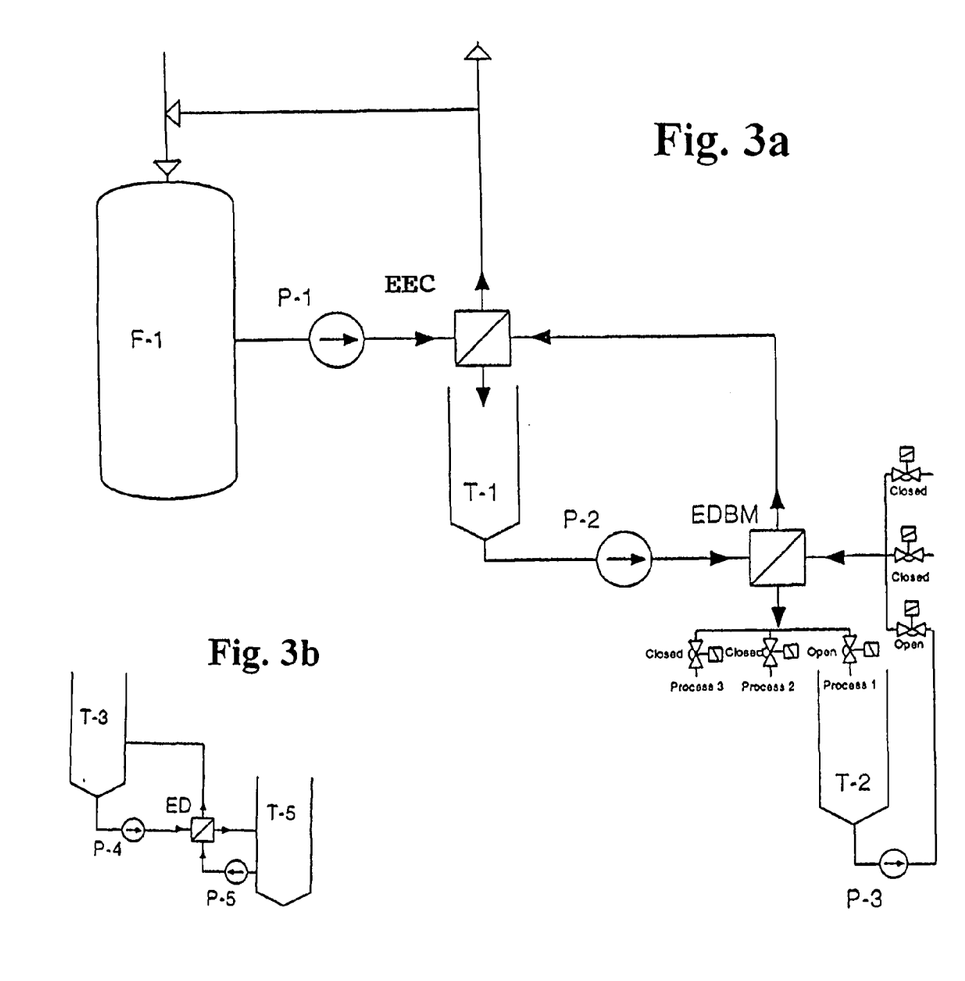
FIG. 3 shows a diagram of the apparatus and method according to the invention

FIG. 3a shows a flow sheet of the method according to the invention. The first tank T1 contains the first liquid L1 which is fed to the electro enhanced dialysis cell EEC and treated herein. Hereafter the first liquid is recycled to the tank T1. In the electro enhanced dialysis cell EEC the ionic species are transferred from the first liquid L1 into the second liquid L2. After treatment in the electro enhanced dialysis cell EEC, the second liquid L2 is first stored in a tank T2, before it is treated in the bipolar electrodialysis cell EDBM. After the treatment in the bipolar electrodialysis cell EDBM the second liquid L2 is recycled to the electro enhanced dialysis cell EEC. The third liquid L3 is treated ind the bipolar electrodialysis cell EDBM where the third liquid L3 receives the ionic species from the second liquid L2. After treatment in the bipolar electrodialysis cell EDBM the third liquid L3 is stored in a tank T3 and recycled trough the bipolar electrodialysis cell until a satisfactory concentration of the ionic species is obtained in the third liquid L3.

In the process it is preferred that e.g. three tanks are used parallel for storing the third liquid L3 from the bipolar electrodialysis cell EDBM. During the process one tank T3 is open for receiving the third liquid L3 and recycle it to the bipolar electrodialysis cell EDBM. The third liquid L3 in the two other tanks is optionally submitted to the processes shown in FIGS. 3b and 3c.

FIG. 3b is a flow sheet showing the process of treating the third liquid L3 in an electrodialysis cell ED to remove undesired ions which are transferred to a fifth liquid L5 and stored in a fifth tank T5.

Figure 3C:
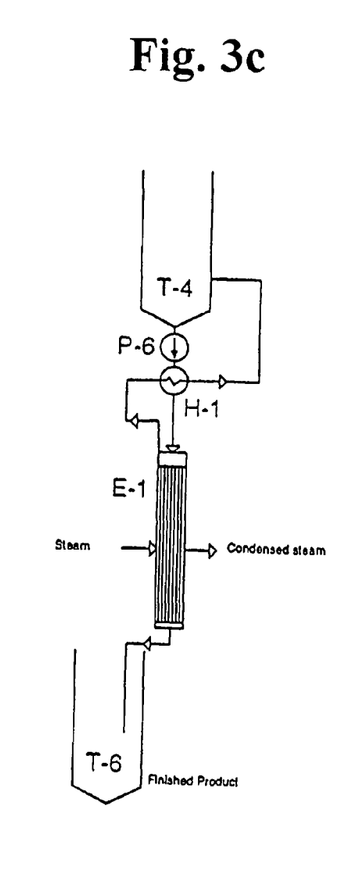

FIG. 3c is a flow sheet showing the process of evaporating the third liquid L3 in an evaporater EV to obtain a concentrated liquid which is stored in the tank T6.

EXAMPLE 2

Figure 4:
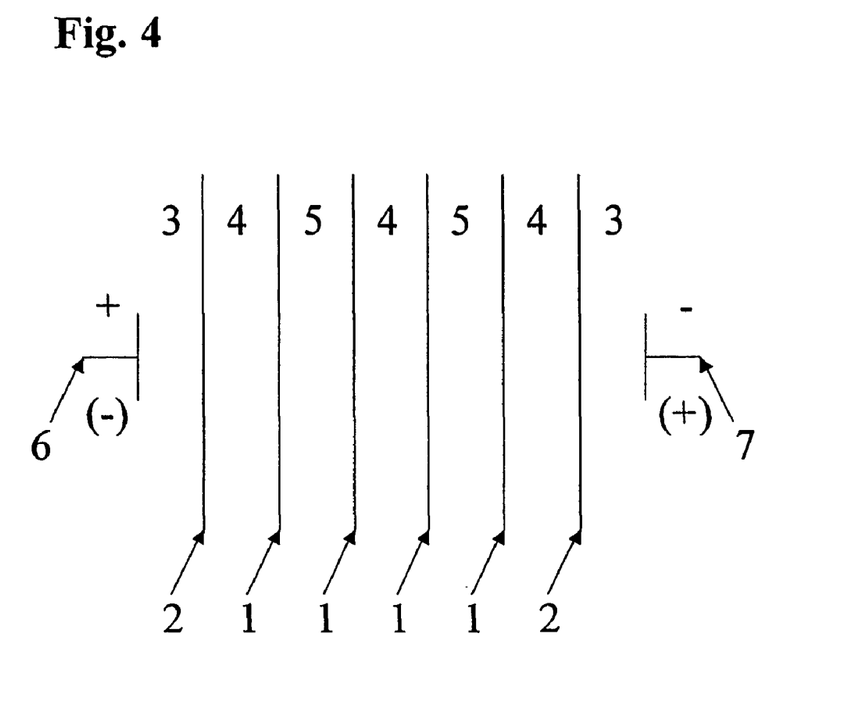
FIG. 4 shows a configuration of an electro enhanced dialysis cell according to the invention.

Description of experimental extraction through a Electro enhanced Dialysis cell according to the invention In the electro enhanced dialysis cell, the cell stack was configured with four anion-exchange membranes 1 (Neosepta AMX, Tokuyama Corp., Japan) and two cation-exchange membranes 2 (Neosepta CMH, Tokuyama Corp., Japan) as shown in FIG. 4. The effective membrane area was 40 cm$^2$.

In the two end-chambers 3 between the platinum electrodes 6 and 7 (each 31.5 cm$^2$) and each cation-exchange membrane, a flow of electrode-rinsing solution was maintained in the end-chambers. The solution was an aqueous solution of 0.1M $K_2SO_4$.

Through the chambers 4, 250 ml of an aqueous alkaline solution of 0.5M KOH (pH 12.5) was pumped from a storage container, to which the solution was returned after each passage. The volume flow was 10 g/s. The thickness of the chambers 4 between the membranes was 6 mm. Net spacers was introduced to promote turbulent flow.

Through the chambers 5, 250 ml of the feed solution, which was fermented brown juice from grass pellet production with around 16 g/l lactic acid, was passed from a storage container. The treated feed solution was returned to the container after each pass. The fermented solution had initially been adjusted to a pH-value of 5.5 by adding KOH pellets. Nothing else had been done to the broth. The volume flow was 10 g/s. The thickness of the chambers 5 was 12 mm. No spacers were introduced in these chambers.

Each chamber 4 and 5 had a 10 cm long flow-path that was 4 cm wide.

The temperature of the electrode-rinse, the alkaline and the fermented solutions was held constant at 40 degrees Celsius during the experiment.

During the experiment, the pH was continuously measured in the fermented solution and held constant at pH 5.5 by titration of more fermented solution (pH 2) with a high lactic acid concentration (70 g/l).

In the middle of each of the chambers 5, a silver/silver chloride electrode was placed, so the voltage drop across a cell pair could be continuously measured by data collection (Fluke 123—Industrial Scopemeter, Fluke Corporation, USA).

When the experiment was started, the electrode-rinse, the fermented broth and the alkaline solution was pumped through the cell. Direct current across the cell was added by a power supply (EA-PS 3032-10 (0 . . . 32V/0 . . . 10 A), EA-Elektro-Automatik, Germany) that regulates the power to uphold a constant current of 1.0 A. An IBM personal computer controlled a relay, shifting the direction of the electrical current every 10 seconds.

Samples from the fermentation broth and the alkaline solution were taken every 30 minutes. pH and conductivity were noted, and lactic content was measured by HPLC using an AMINEX HPX-87H column (Biorad, USA) at 35 degrees Celsius using 4 mM sulfuric acid as eluent.

After 4 hours, the alkaline solution was replaced by a fresh solution, and the experiment was continued.

Figure 5:
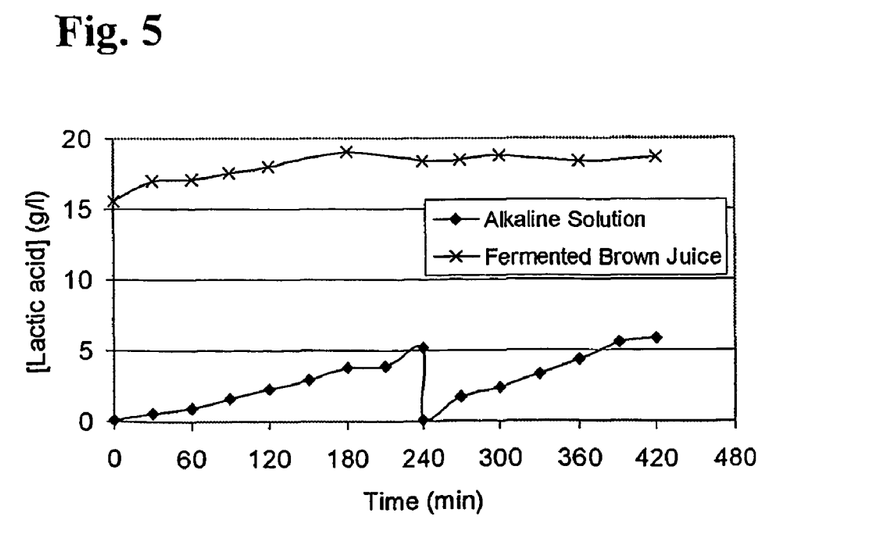
FIG. 5 shows the concentration of lactic acid in a feed stream and alkaline solution.

FIG. 5 shows the concentration profile of lactic acid in the feed and alkaline solutions during an eight-hour experiment. In the fermented brown juice, the initial lactic acid concentration of 16 g/l goes up during the experiment, because pH is regulated by titration of fermentation solution having higher lactic acid content. The alkaline solution was replaced after four hours to simulate the regeneration process in the EDBM process.

The lactate flux was found to be $1.2 \cdot 10^{-4}$ mol/m²s during the first four hours, and $1.7 \cdot 10^{-4}$ mol/m²s during the next four hours. Some of this increase might originate from the rising lactate concentration in the feed.

Figure 6:
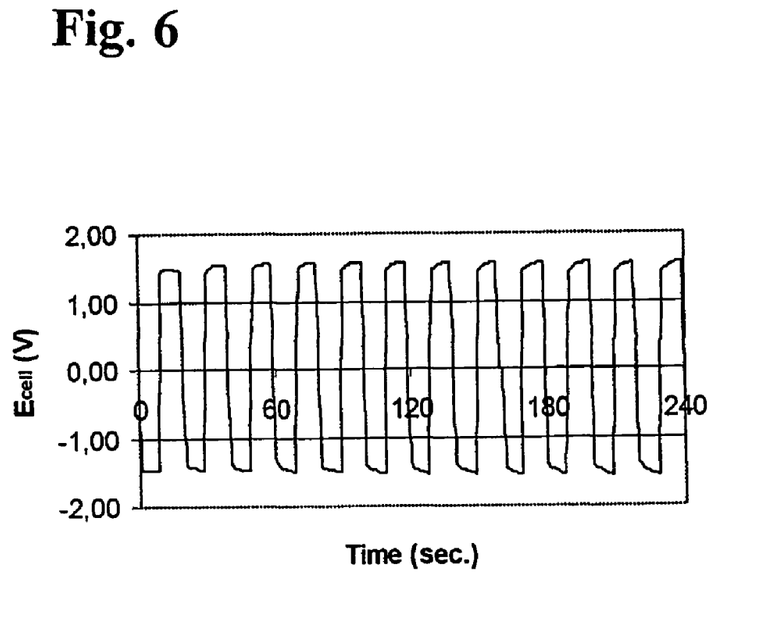
FIG. 6 shows the potential drop across an electro enhanced dialysis cell pair.
Figure 7:
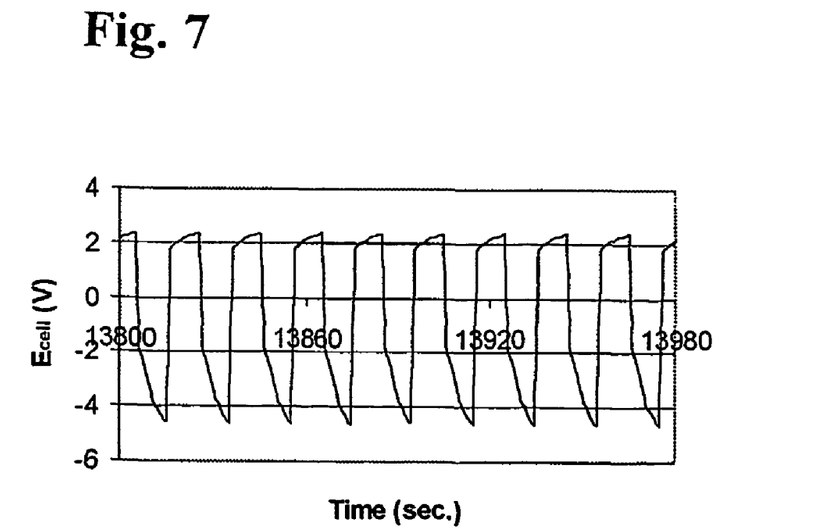
FIG. 7 shows the potential drop across an electro enhanced dialysis cell pair.

FIGS. 6 and 7 show the potential drop across a cell pair at the beginning and at the end of the first four-hour run, respectively. The 10 second intervals were evident as the direction of current changes between positive and negative potential drops. At the beginning of each interval, both figures show an almost constant initial drop that in FIG. 3 increases slightly and in FIG. 4 increases significantly during the 10 seconds. These increments relate to the increase of electrical resistance partly from ionic polarization, but also from a build-up of organic matter on the membrane surface in the feed chamber.

Figure 8:
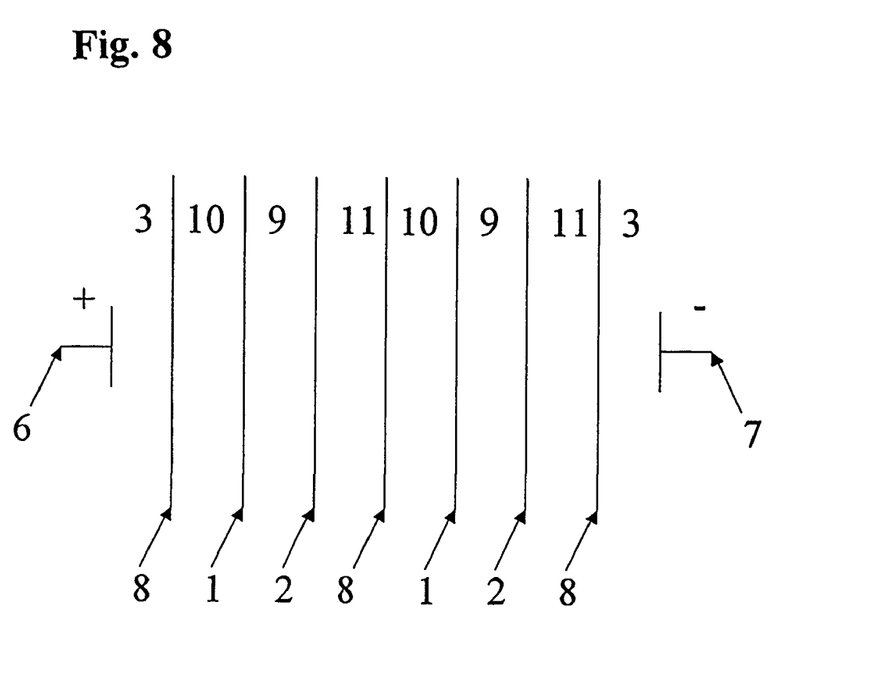
FIG. 8 shows a configuration of a bipolar electrodialysis cell according to the invention.

Especially FIG. 8 shows that the organic fouling can be removed by changing the direction of the electric current. The reversal does not remove the organic matter completely, as an increase in initial cell-resistance from about 1.5 Ohm to 2 Ohm was evident during the experiment.

The divergence between the form of the positive and negative potential drop in FIG. 8 must derive from different flow conditions in the two feed chambers in the laboratory equipment.

EXAMPLE 3

The electro enhanced dialysis cell was configured as in example 1 but the AMX anion-exchange membrane was replaced with a monoselective anion-exchange membrane (Neosepta ACS, Tokuyama Corp., Japan).

500 ml brown juice was circulated in the feed chambers and the pH was held constant at 5.5 by titration of lactic acid. In the base chambers 500 ml of 0.5 M KOH was passed and 500 ml 0.1 M $K_2SO_4$ was used as electrode rinsing solution.

Samples were taken at 0, 60, and 120 min. from the feed and base streams and the contents of calcium and magnesium were determined by Atom Absorption Spectroscopy (AAS).

| Time (min) | $[Ca^{2+}]_{Feed}$ (mg/l) | $[Ca^{2+}]_{Base}$ (mg/l) | $[Mg^{2+}]_{Feed}$ (mg/l) | $[Mg^{2+}]_{Base}$ (mg/l) |
|---|---|---|---|---|
| 0 | 667 | 0.15 | 394 | 0.01 |
| 60 | 737 | 0.09 | 425 | 0.01 |
| 120 | 705 | 0.13 | 403 | 0.02 |

From these results, it is evident that divalent cations are retained sufficiently to be non-damaging in the following EDBM process which usually requires such concentrations to be lower than 2 ppm.

Using a mono-selective anion-exchange membrane in this experiment does not affect retention of cations significantly, but does improve retention of divalent anions such as sulfate and phosphate.

EXAMPLE 4

In the experiments with the bipolar electrodialysis cell, the cell was equipped with three bipolar membranes 8 in FIG. 8 (Neosepta BP-1, Tokuyama Corp., Japan), two anion-exchange membranes 1 (Neosepta AMX, Tokuyama Corp., Japan) and two cation-exchange membranes 2 (Neosepta CMH, Tokuyama Corp., Japan) as shown on FIG. 8.

In the two end-chambers 3 between the platinum electrodes 6 and 7 (each 31.5 cm²) and a set of bipolar membranes, a flow of electrode-rinsing solution was established. The electrode-rinsing solution was an aqueous solution of 0.1M $K_2SO_4$. Through the feed chambers 9 between the anion-exchange membrane and the cation exchange membrane 500 ml of a mixture of 0.5 M KOH and 0.4 M lactic acid was circulated to a container. 1000 ml of an alkaline 0.1 M KOH solution was circulated in both the acid chamber 10 between the bipolar membrane and the anion-exchange membrane and in the base chamber 11 between the bipolar membrane and the cation-exchange membrane. The streams from the acid and base chambers 10 and 11 were mixed in a container after each pass. The thickness of the chambers 9, 10, and 11 between the membranes was 6 mm. Net spacers were introduced to promote turbulent flow.

The temperature of the electrode-rinse, the feed and the base solutions was held constant at 40 degrees Celsius during the experiment.

In the feed chambers 9, silver/silver chloride electrodes were placed so the voltage drop across a cell pair could be continuously measured and data collected (Fluke 123—Industrial Scopemeter, Fluke Corporation, USA). Samples from the feed and the alkaline solution were taken every 30 minutes. pH and conductivity were noted, and lactic content was measured by HPLC using an AMINEX HPX-87H column (Biorad, USA) at 35 degrees Celsius using 4 mM sulfuric acid as eluent.

Figure 9:
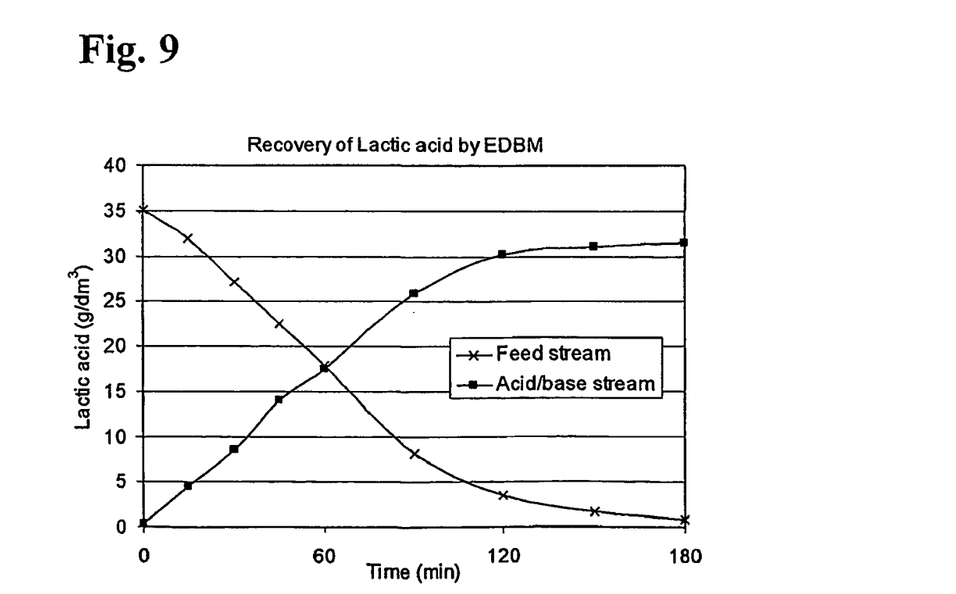
FIG. 9 shows the transport of lactate from a feed stream to a combined acid and base stream.

FIG. 9 shows the transport of lactate from the feed stream to the combined acid and base stream, reaching a lactate concentration of 0.8 g/l in the feed stream after 180 min., corresponding to more than 97% acid recovery.

Figure 10:
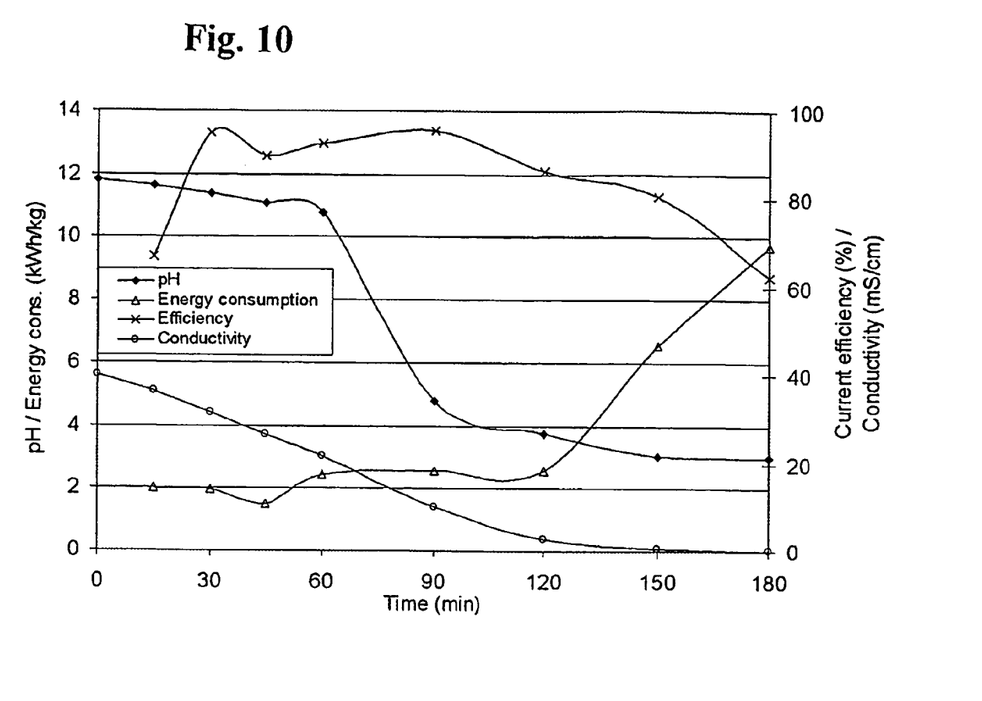
FIG. 10 shows the pH and conductivity as well as current efficiency and energy consumption in a feed stream.

FIG. 10 shows the pH and conductivity in the feed solution during the experiment as well as the current efficiency, and corresponding effect on energy consumption. It is clear that the significant decrease in conductivity near the end of the experiment was causing a rise in cell resistance and thus energy consumption.

The current efficiency was above 80% during most of the experiment, except for the beginning and final part. The low efficiency in the final phase probably originates from polarization, leading to ineffective water-splitting at the monopolar membranes.

EXAMPLE 5

Another experiment with a bipolar electrodialysis cell was carried out exactly as example 4, except the 500 ml feed mixture was composed of 0.5M KOH, 0.1M (0.3N) citric acid, and 0.05M (0.1N) malic acid.

The acid content of the samples was measured by HPLC as before.

Figure 11:
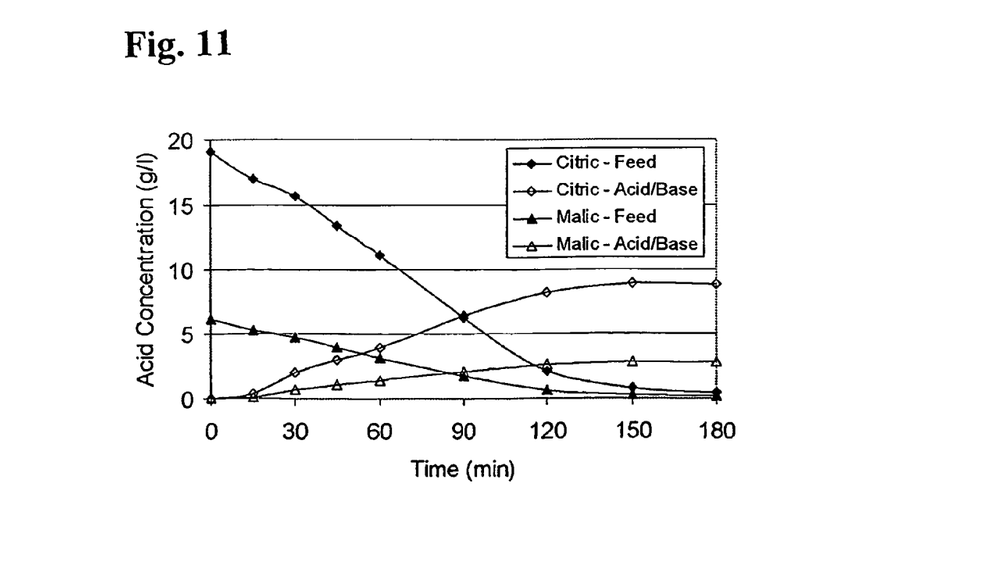
FIG. 11 shows the concentration profiles of citric and malic acid.

FIG. 11 shows the concentration profiles of the citric and malic acid in the feed solution and the mixed acid/base solution.

From FIG. 11 it is evident that most of the citric and malic acid is extracted from the feed solution. The recovery of both citric and malic acid was higher than 97%.

Figure 12:
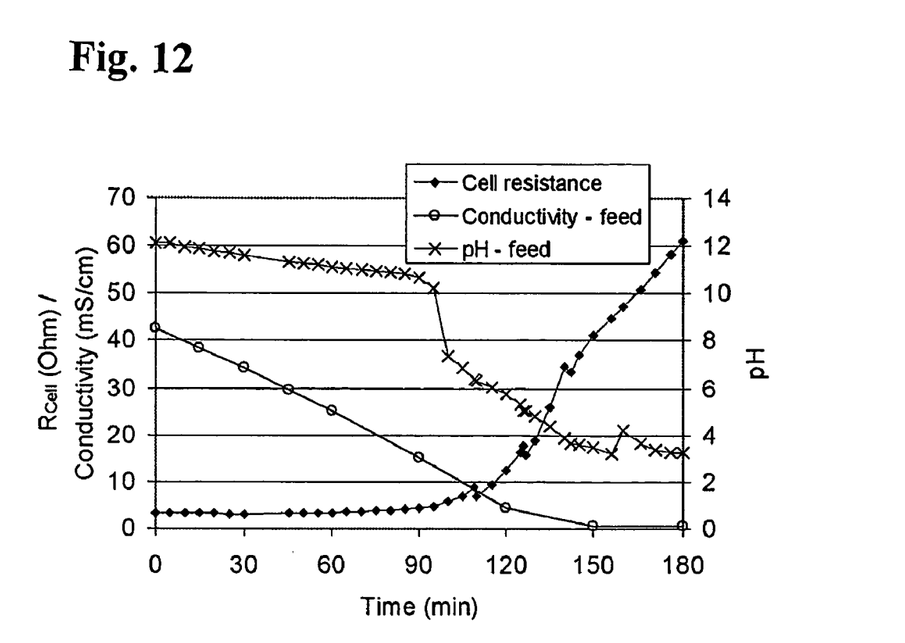
FIG. 12 shows the conductivity, pH and cell resistance in a cell.

However, the recovery of the last 5-10% of the organic acids is very costly, as can be seen in FIG. 12. As pH and conductivity in the feed decrease, cell resistance and thus energy consumption increase drastically.

EXAMPLE 6

The electro enhanced dialysis cell stack was configured as in example 1, but with 4 cation-exchange membranes (Neosepta CMB, Tokuyama Corp., Japan) replacing the anion-exchange membranes and (Neosepta AMX, Tokuyama Corp., Japan) membranes replacing the cation-exchange membranes.

250 ml aqueous solution of 0.2 M glycine, which is an amino acid with $pK_{COOH}$=2.34, $pK_{NH3+}$=9.60 and pI=5.97, was circulated in the feed chambers. In the dialysate chambers 1750 ml of 0.1M $H_2SO_4$ was circulated and 500 ml 0.1 M $Na_2SO_4$ was used as electrode rinsing solution. The concentration of glycine was determined using HPLC. The liquids were circulated for 5 min. before the experiment was started. Current reversal was omitted as the feed stream did not contain material that could cause fouling of the membranes.

Figure 13:
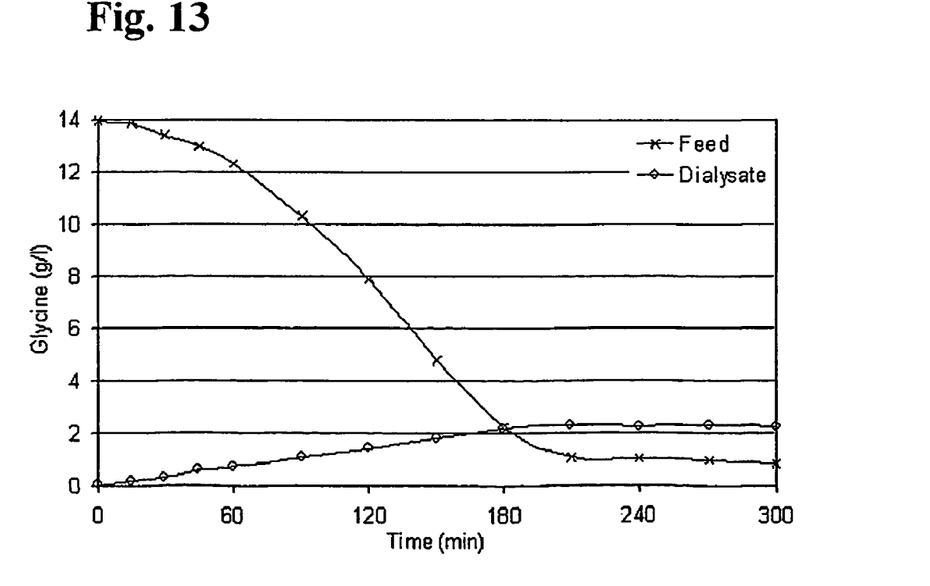
FIG. 13 shows the concentration of glycine.
Figure 14:
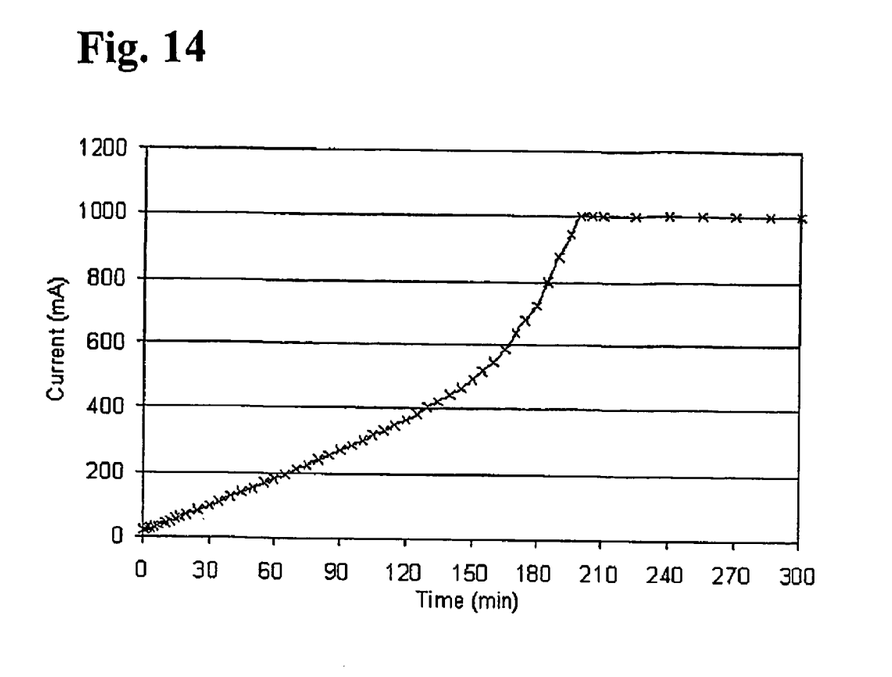
FIG. 14 shows the current through the stack.

FIG. 13 shows the concentration of glycine in the feed and dialysate during the experiment. At the beginning of the experiment glycine is transported from the feed stream to the dialysate stream at a relatively low rate because the starting pH is close to the isoelectric point of the amino acid. The voltage drop across a cell pair was not allowed to exceed 14 V, which resulted in a current starting very low and slowly increasing as pH went down and conductivity increased in the feed, see FIG. 14. Within 180 min. 84% of the glycine is removed from the feed at a current efficiency of 58%.

EXAMPLE 7

The electro enhanced dialysis cell stack was configured as in example 5.

250 ml aqueous solution consisting of 50 g/l bakers yeast and 0.2 M lysine, which at the experimental conditions was a positively charged amino acid, was circulated in the feed chambers. In the dialysate chambers 1750 ml of 0.1M $H_2SO_4$ was circulated and 500 ml 0.1 M $Na_2SO_4$ was used as electrode rinsing solution. The liquids were circulated for 5 min. before the experiment was started.

Direct current across the cell was added by a power supply (EA-PS 9072-040 (0 . . . 72V/0 . . . 40 A), EA-Elektro-Automatik, Germany) regulating the power to keep a constant current of 1.0 A. The concentration of lysine is determined using HPLC.

Without current reversal the experiment had to be terminated as the voltage drop across a single cell pair increased from 10V to 30V during the first 8 minutes in order to keep a current of 1 A (25 mA/cm$^2$)

Figure 15:
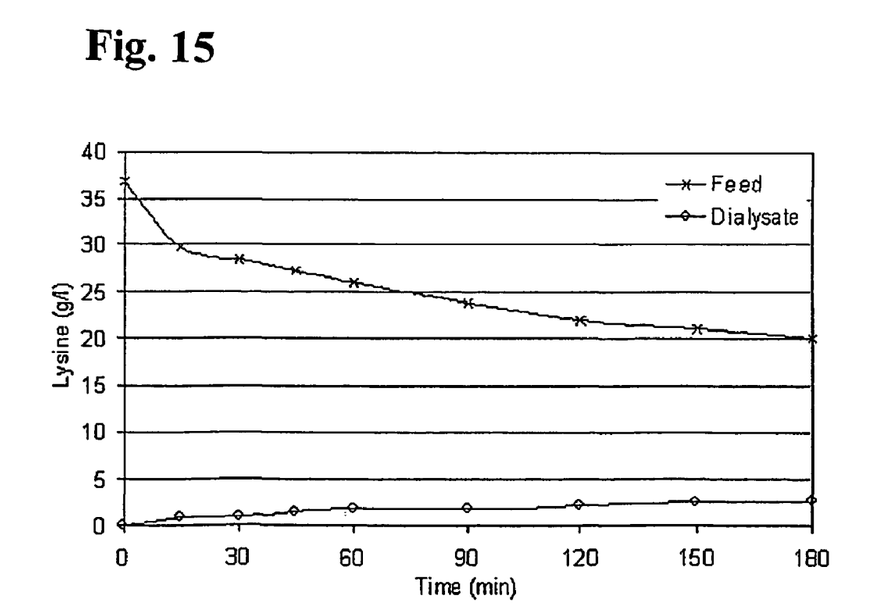
FIG. 15 shows the concentration of lysine

When the experiment was repeated with a current reversal time of 300 sec., it was possible to keep the average voltage drop across a cell pair at approx. 15 V. FIG. 15 shows the concentration of lysine in the feed and dialysate during the experiment. During the first 60 min. of the experiment the lysine concentration in the feed decreased 30% at a current efficiency of 24%.

The invention claimed is:

1. An ionic transfer apparatus comprising a plurality of chambers including at least
   a) an electrode chamber at each end of the apparatus and bounded by an end membrane, each electrode chamber containing an electrode, each electrode having opposite polarity from the electrode in the electrode chamber at the opposite end of the apparatus, the end membranes are selected from the group consisting of cation exchange membranes, anion exchange membranes, and neutral membranes;
   b) a first and a second ionic transfer chamber, each of the ionic transfer chambers being adjacent to one of the end membranes and having a first and a second ionic membrane spaced apart from said end membrane, each of the first and second ionic membranes having a different ionic property compared to each end membrane;
   c) either no additional ionic membrane or, optionally, an even-number of supplemental ionic membranes disposed between said first and second ionic membranes and spaced apart from said first and second ionic membranes and from each other to form at least one additional ionic transfer chamber between said first and second ionic transfer chambers, the first and second ionic membranes, and supplemental ionic membranes, if present, are either all cation exchange membranes or all anion exchange membranes; and
   d) means for reversing the polarities of said electrodes during operation of said apparatus;
   e) a first liquid from which ions are to be transferred contained in the at least one additional ionic transfer chamber, a second liquid into which ions are to be transferred contained in the first and second ionic transfer chambers, wherein when a plurality of additional ionic transfer chambers are present between the first and second ionic transfer chambers, the additional ionic chambers alternately contain the first liquid and the second liquid such that no two adjacent ionic transfer chambers contain the same liquid;
   f) means for circulating the second liquid from the first and second ionic transfer chambers and additional ionic chambers, if present, into a bipolar electrodialysis cell; and
   g) a bipolar electrodialysis cell for transferring ions from the second liquid into a third liquid.

2. The apparatus according to claim 1 further comprising means for separating undesired ions from the third liquid.

3. The apparatus according to claim 2, wherein the means for separating undesired ions from the third liquid is an electrodialysis cell.

4. The apparatus according to claim 3 in which said electrodialysis cell is placed downstream of said bipolar electrodialysis cell.

5. The apparatus according to claim 1 further comprising means for evaporating or crystallizing or chromatographically treating the third liquid.

6. An ionic transfer apparatus comprising a plurality of chambers including at least:
   a) an electrode chamber at each end of the apparatus and bounded by an end membrane, each electrode chamber containing an electrode, each electrode having opposite polarity from the electrode in the electrode chamber at the opposite end of the apparatus, the end membranes are members selected from the group consisting of cation exchange membranes, anion exchange membranes, and neutral membranes;
   b) a first and a second ionic transfer chamber, each of the ionic transfer chambers being adjacent to one of the end membranes and having a first and a second ionic membrane spaced apart from said end membrane;
   c) either no additional ionic membrane or, optionally, an even-number of supplemental ionic membranes disposed between said first and second ionic membranes and spaced apart from said first and second ionic membranes and from each other to form at least one additional ionic transfer chamber between said first and second ionic transfer chambers, the first and second ionic membranes, and supplemental ionic membranes, if present, are either all cation exchange membranes or all anion exchange membranes;
   d) means for reversing the polarities of said electrodes during operation of said apparatus;
   e) a first liquid from which ions are to be transferred contained in the at least one additional ionic transfer chamber, a second liquid into which ions are to be transferred contained in the first and second ionic transfer chambers, wherein when a plurality of additional ionic transfer chambers are present between the first and second ionic transfer chambers, the additional ionic chambers alternately contain the first liquid and the second liquid such that no two adjacent ionic transfer chambers contain the same liquid;
   f) means for circulating the second liquid from the first and second ionic transfer chambers and additional ionic chambers, if present, into a bipolar electrodialysis cell; and
   g) a bipolar electrodialysis cell for transferring ions from the second liquid into a third liquid.

7. A method for transferring ions comprising the steps of:
   a) passing a first liquid from which ions are to be transferred through at least a first ionic transfer chamber formed between at least two ionic membranes spaced apart from each other, which at least two ionic membranes are both cation exchange membranes or both anion exchange membranes;
   b) passing a second liquid into which ions are to be transferred through at least a second ionic transfer chamber and a third ionic transfer chamber, each of said second and third ionic transfer chambers being adjacent to an ionic membrane of the first ionic transfer chamber, and having spaced apart from said ionic transfer membrane an end membrane, which end membranes are members selected from the group consisting of cation exchange membranes, anion exchange membranes and neutral membranes;
   c) applying an electric field across the end membranes and the ionic transfer membranes by means of two electrodes, each electrode contained in an electrode chamber bounded by an end membrane and having opposite polarity from the electrode contained in the other electrode chamber;
   d) reversing the direction of the electric field across said end membranes and said ionic transfer membranes by reversing the polarity of said electrodes;
   e) passing the second liquid to a bipolar electrodialysis cell; and
   f) transferring ions from the second liquid into a third liquid in the bipolar electrodialysis cell.

8. An apparatus for separating ionic species from liquids containing particles of organic material and multivalent inorganic metal ions by transferring ionic species from a first liquid to a second liquid comprising:
   at least two ion exchange members selected from the group consisting of cation exchange members and anion exchange members, the two ion exchange members defining there between a first chamber for the first liquid, the first chamber including an inlet for the first liquid at one end of the chamber and an exit for the first liquid at another end of the first chamber;
   at least two further chambers for the second liquid, each further chamber being located adjacent to the at least one first chamber;
   a set of end membranes;
   means for applying an electric field over the membranes and means for changing the direction of the electric field at predetermined substantially regular intervals being between about 5 seconds and 6000 seconds;
   means for treating the second liquid in a biopolar electrodialysis cell to transfer the ionic species from the second liquid into a third liquid.

9. The apparatus according to claim 8, comprising means for separating the ionic species from the third liquid.

10. The apparatus according to claim 9, wherein the means for separating the ionic species from the third liquid comprises an electrodialysis cell adapted to remove undesired ions from the third liquid.

11. The apparatus according to claim 10, wherein the electrodialysis cell is placed downstream of the biopolar electrodialysis cell.

12. The apparatus according to claim 8, further comprising means for performing at least one treatment on the third liquid, the at least one treatment being selected from the group consisting of: evaporation, crystallization, and a chromatographical treatment.

13. A method of separating ionic species from liquids containing particles of organic material and multivalent inorganic metal ions by transfering ionic species from a first liquid to a second liquid comprising the steps of:
   passing the first liquid through at least one first chamber defined by a pair of either cation exchange membranes or anion exchange membranes by entering the first liquid at one end of the first chamber and removing the first liquid at an opposite end of the first chamber;
   passing the second liquid which has an ionic component in a higher concentration than a concentration of the same component in the first liquid, through at least two further chambers, each further chamber being located adjacent to at least one first chamber;

applying an electric field over the membranes by means of at least two electrodes and changing the direction of the electric field during transfer of ionic species in predetermined substantially regular intervals that are within a range from 5 seconds to 6000 seconds;

wherein the second liquid is treated in a biopolar electrodialysis cell to transfer the ionic species from the second liquid into a third liquid.

14. The method of claim 13, wherein the ionic species are separated from the third liquid.

15. The method of claim 13, wherein the third liquid is stored in a third tank after being discharged from the bipolar electrodialysis.

16. The method of claim 15, wherein at least part of the third liquid is recycled from the third liquid to the bipolar electrodialysis cell.

17. The method of claim 13, further comprising the step of treating the third liquid in an electrodialysis cell to remove undesired ions.

18. The method of claim 13, further comprising the step of performing at least one treatment on the third liquid, the at least one treatment being selected from the group consisting of: evaporation, crystallization, and a chromatographical treatment.

19. A method of separating ionic species from liquids containing particles of organic material and multivalent inorganic metal ions by transfering ionic species from a first liquid to a second liquid comprising the steps of:

passing the first liquid through at least one first chamber defined by a pair of either cation exchange membranes or anion exchange membranes by entering the first liquid at one end of the first chamber and removing the first liquid at an opposite end of the first chamber, where the pair of either cation exchange membranes or anion exchange membranes have the same charge and valence selectivity with respect to each other;

passing the second liquid which has an ionic component in a higher concentration than a concentration of the same component in the first liquid, through at least two further chambers, each further chamber being located adjacent to at least one first chamber;

applying an electric field over the membranes by means of at least two electrodes and changing the direction of the electric field during transfer of ionic species in predetermined substantially regular intervals that are within a range from 5 seconds to 6000 seconds;

wherein the liquid containing particles of organic material and multivalent inorganic metal ions is a fermentation liquid.

20. The method of claim 19, wherein the ionic component of the second liquid is either $H^+$ or $OH^-$.

21. The method of claim 19, wherein the liquids are passed through chambers defined by membranes where the chambers are alternatingly adapted to receive either the first liquid or the second liquid.

22. The method of claim 19, further comprising the step of using an end membrane disposed between the electrode and another membrane.

23. The method of claim 22, further comprising using end membranes selected from the group consisting of neutral membranes, cation membranes and anion membranes.

24. The method of claim 19, further comprising the step of applying an electrode rinsed to the electrode chamber.

25. The method of claim 24, wherein the electrode rinse is a separate liquid.

26. The method of claim 25, wherein the separate liquid is a solution of electrolytes.

27. The method of claim 26, wherein the electrolytes are selected between $K_2SO_4$ and $Na_2SO_4$.

28. The method of claim 19, further comprising the step of providing a turbulent flow in at least the first chamber.

29. The method of claim 19, wherein the intervals are within a range from 8 second to 1000 seconds.

30. The method of claim 29, wherein the intervals are within a range from 10 seconds to 360 seconds.

31. The method of claim 19, wherein the ionic species comprises anions.

32. The method of claim 31, wherein the anions are selected from a group consisting of anions from inorganic acids, organic acids, enzymes, peptides, hormones, antibiotics and amino acids.

33. The method of claim 19, wherein the ionic species have a molar weight up to 1000 g/mol.

34. The method of claim 19, wherein the liquid containing particles of organic material and multivalent inorganic metal ions is a stream from food processing.

35. The method of claim 19, further comprising the step of storing the first liquid in a first tank before being passed through the first chamber.

36. The method of claim 35, wherein at least a part of the first liquid is recycled to the first tank.

37. The method of claim 19, further comprising the step of storing the second liquid in a second tank before being passed through the further chambers.

38. The method of claim 37, wherein at least a part of the second liquid is recycled to the flow chambers after being treated in the bipolar electrodialysis cell.

* * * * *